(12) United States Patent
Taki et al.

(10) Patent No.: US 11,932,742 B2
(45) Date of Patent: Mar. 19, 2024

(54) LAMINATED POLYESTER FILM

(71) Applicant: TOYOBO CO., LTD., Osaka (JP)

(72) Inventors: Hiroshi Taki, Otsu (JP); Noriyuki Takagi, Otsu (JP); Isao Takii, Otsu (JP)

(73) Assignee: TOYOBO CO., LTD., Osaka (JP)

( * ) Notice: Subject to any disclaimer, the term of this patent is extended or adjusted under 35 U.S.C. 154(b) by 0 days.

(21) Appl. No.: 17/763,061

(22) PCT Filed: Oct. 23, 2020

(86) PCT No.: PCT/JP2020/039892
§ 371 (c)(1),
(2) Date: Mar. 23, 2022

(87) PCT Pub. No.: WO2021/085327
PCT Pub. Date: May 6, 2021

(65) Prior Publication Data
US 2022/0332910 A1    Oct. 20, 2022

(30) Foreign Application Priority Data
Oct. 29, 2019  (JP) .................................. 2019-196007

(51) Int. Cl.
*C08J 7/04* (2020.01)
*C08J 5/18* (2006.01)

(52) U.S. Cl.
CPC .............. *C08J 7/0427* (2020.01); *C08J 5/18* (2013.01); *C08J 2367/02* (2013.01); *C08J 2475/06* (2013.01)

(58) Field of Classification Search
None
See application file for complete search history.

(56) References Cited

U.S. PATENT DOCUMENTS

| | | |
|---|---|---|
| 2010/0136328 A1 | 6/2010 | Okuzu et al. |
| 2011/0051245 A1 | 3/2011 | Masuda et al. |
| 2013/0078471 A1 | 3/2013 | Hiraki et al. |
| 2013/0260144 A1 | 10/2013 | Yamazaki et al. |
| 2014/0166106 A1 | 6/2014 | Shirasaki et al. |
| 2016/0244633 A1 | 8/2016 | Kawasaki |
| 2016/0312076 A1 | 10/2016 | Shu |
| 2018/0187043 A1* | 7/2018 | Noatschk ................. C08J 9/365 |
| 2020/0010698 A1* | 1/2020 | Kurashina .............. C09D 5/002 |

FOREIGN PATENT DOCUMENTS

| | | | |
|---|---|---|---|
| CA | 3052128 A1 * | 9/2018 | .......... B32B 27/308 |
| CN | 101578327 A | 11/2009 | |
| CN | 101977768 A | 2/2011 | |
| CN | 102648094 A | 8/2012 | |
| CN | 102858533 A | 1/2013 | |
| CN | 105829106 A | 8/2016 | |
| CN | 105916686 A | 8/2016 | |
| EP | 2561985 A1 | 2/2013 | |
| EP | 3263336 A1 | 1/2018 | |
| JP | S58-027724 A | 2/1983 | |
| JP | 2000-229355 A | 8/2000 | |
| JP | 2006-028378 A | 2/2006 | |
| JP | 2009-220376 A | 10/2009 | |
| JP | 2009-234009 A | 10/2009 | |
| JP | 2009-269301 A | 11/2009 | |
| JP | 2011-140124 A | 7/2011 | |
| JP | 2012-223926 A | 11/2012 | |
| JP | 2016-216655 A | 12/2016 | |
| JP | 2018-171614 A | 11/2018 | |
| WO | WO 2012/108449 A1 | 8/2012 | |
| WO | WO 2016/125397 A1 | 8/2016 | |
| WO | WO 2018/123795 A1 | 7/2018 | |
| WO | WO 2019/131414 A1 | 7/2019 | |

OTHER PUBLICATIONS

Japanese Patent Office, International Search Report in International Patent Application No. PCT/JP2020/039892 (dated Jan. 12, 2021).
European Patent Office, Extended European Search Report in European Patent Application No. 20883219.6 (dated Oct. 24, 2023).

\* cited by examiner

*Primary Examiner* — Jeffrey D Washville
(74) *Attorney, Agent, or Firm* — Leydig, Voit & Mayer, Ltd.

(57) ABSTRACT

An object of the present invention is to provide a laminated polyester film that has good adhesion to an UV-curable resin, particularly has excellent adhesion to a coating agent such as an UV-curable ink, and has an excellent property to keep the adhesion at a high level over a long period of time. A laminated polyester film comprising: a polyester film; and a coating layer on at least one surface of the polyester film, the coating layer comprising a composition containing a polyurethane resin having a carboxyl group and having an acid value of 30 to 50 mgKOH/g and a crosslinking agent having a carboxyl group and having an acid value of 30 to 50 mgKOH/g.

5 Claims, No Drawings

LAMINATED POLYESTER FILM

TECHNICAL FIELD

The present invention relates to a laminated polyester film. More specifically, the present invention relates to a laminated polyester film comprising a readily adhesive coating layer that is highly suitable for use in all fields, such as optics, packaging, and labeling.

Thermoplastic resin films, in particular, polyester films, have excellent properties in terms of mechanical properties, electrical properties, dimensional stability, transparency, chemical resistance, etc. Therefore, such films can find wide application, for example, in magnetic recording materials; packaging materials; solar-cell applications; anti-reflection films for use in flat displays etc.; diffusion sheets; optical films such as prism sheets; and films for label printing. However, since polyester films have highly oriented crystals on the surface thereof, polyester films have a disadvantage in terms of poor adhesion to various paints, resins, and inks in processing for these applications.

For this reason, various methods have been heretofore investigated to impart adhesion to the surface of a polyester film.

For example, surface activation methods, such as methods comprising subjecting the surface of a substrate polyester film to corona discharge treatment, ultraviolet irradiation treatment, plasma treatment, or the like, were heretofore known as methods for imparting adhesion. However, since the adhesion effect obtained by these treatments is reduced over time, it was difficult to maintain a high level of adhesion over a long period of time (Patent Literature (PTL) 1).

Therefore, a method comprising applying various resins to the surface of a polyester film to form a readily adhesive coating layer is often used.

Heretofore, there has been known a technique that comprises forming a coating layer using a coating liquid containing a copolyester resin or a urethane resin or using a coating liquid containing a copolyester resin, a urethane resin, and a crosslinking agent to enhance affinity to and thereby enable easy adhesion to a resin component such as polyurethane acrylate or ester acrylate used in hard coating agents and prismatic lens agents (Patent Literature (PTL) 2 and 3). However, UV-curable inks (ultraviolet-curable inks) used for label printing contain, in addition to the resin, a dye or a pigment to express color tone, and a pigment having relatively good light-fastness accounts for about 15 to 25 wt. % of the ink component. Further, since white inks that are required to have hiding properties contain a white pigment in a high proportion of about 50 wt. %, the conventional techniques remain insufficient to achieve good adhesion to the white inks, and it is especially difficult to achieve high adhesion when the white ink is cured at a low dose of UV irradiation.

CITATION LIST

Patent Literature

PTL 1: JPS58-27724A
PTL 2: JP2000-229355A
PTL 3: JP2009-220376A

SUMMARY OF INVENTION

Technical Problem

The present invention was made in view of the above problem of the prior art. More specifically, an object of the present invention is to provide a laminated polyester film that has good adhesion to UV-curable resins, particularly to coating agents, such as UV-curable inks, and that is also excellent in maintaining a high level of adhesion over a long period of time.

Solution to Problem

Specifically, the present invention has the following features.
1. A laminated polyester film comprising
   a polyester film and
   a coating layer on at least one surface of the polyester film,
   the coating layer comprising a composition containing
   a polyurethane resin having a carboxyl group and having an acid value of 30 to 50 mgKOH/g and
   a crosslinking agent having a carboxyl group and having an acid value of 30 to 50 mgKOH/g.
2. The laminated polyester film according to Item 1, wherein the crosslinking agent is an isocyanate compound.

Advantageous Effects of Invention

The laminated polyester film of the present invention has excellent adhesion to a UV-curable resin, such as a hardcoat layer, a lens layer, and an ink, and particularly has a high level of adhesion to a UV-curable ink.

DESCRIPTION OF EMBODIMENTS

Polyester Film Substrate

Examples of polyester resins that can be used to form the polyester film substrate of the present invention include polyethylene terephthalate, polybutylene terephthalate, polyethylene-2,6-naphthalate, polytrimethylene terephthalate; and copolyester resins in which a portion of the diol component or dicarboxylic acid component of a polyester resin described above is replaced by a copolymerization component. Examples of such copolymer components include diol components, such as diethylene glycol, neopentyl glycol, 1,4-cyclohexanedimethanol, and polyalkylene glycol; dicarboxylic acid components, such as adipic acid, sebacic acid, phthalic acid, isophthalic acid, 5-sodium isophthalic acid, and 2,6-naphthalenedicarboxylic acid; and the like.

The polyester resin preferably used for the polyester film substrate of the present invention is mainly selected from polyethylene terephthalate, polytrimethylene terephthalate, polybutylene terephthalate, and polyethylene-2,6-naphthalate. Among these polyester resins, polyethylene terephthalate is most preferred from the viewpoint of the balance between physical properties and cost. The polyester film substrate formed using such a polyester resin is preferably a biaxially stretched polyester film, and can improve chemical resistance, heat resistance, mechanical strength, and the like.

The catalyst for polycondensation used in the production of the polyester resin is not particularly limited. Antimony trioxide is preferable from the viewpoint of low cost and excellent catalytic activity. Using a germanium compound or a titanium compound is also preferable. Examples of more preferred polycondensation catalysts include catalysts containing aluminum and/or an aluminum compound and a phenolic compound; catalysts containing aluminum and/or an aluminum compound and a phosphorus compound; and catalysts containing an aluminum salt of a phosphorus compound.

The layer structure of the polyester film substrate of the present invention is not particularly limited, and may be a single-layer polyester film, a polyester film with a two-layer structure in which components of the two layers are different, or a polyester film substrate composed of at least three layers comprising outer layers and an inner layer.

Coating Layer

In order to enhance adhesion to the hardcoat layer, adhesion to UV-curable inks, and blocking resistance, the laminated polyester film of the present invention preferably has a coating layer formed on at least one surface of the polyester film by using a composition comprising a polyurethane resin having a carboxyl group and having an acid value of 30 to 50 mgKOH/g and a crosslinking agent having a carboxyl group and having an acid value of 30 to 50 mgKOH/g. The coating layer may be formed on both surfaces of the polyester film; or may be formed on only one surface of the polyester film, and a different type of resin coating layer may be formed on the other surface.

The coating layer of the present invention has excellent adhesion to a UV-curable resin or a thermosetting resin, such as a hardcoat layer, a lens layer, or an ink, and has particularly excellent adhesion to an ink containing a pigment etc. This effect is presumed to be due to the interaction between the carboxyl group of the coating layer and pigment particles of the ink. Further, since the polyurethane resin and the crosslinking agent both contain carboxyl groups in amounts within a certain range, the present invention makes it possible for the coating layer itself to contain many carboxyl groups, while suppressing drawbacks, such as poor wet-heat resistance caused by reduced water resistance, which would occur due to the presence of many carboxyl groups only in one resin.

The weight ratio of the polyurethane resin having a carboxyl group to the crosslinking agent having a carboxyl group is preferably in the range of 90/10 to 10/90, more preferably 80/20 to 20/80, and even more preferably 70/30 to 30/70. If the amount of the crosslinking agent is small, durability such as wet-heat resistance is reduced. On the other hand, if the amount of the polyurethane resin is small, adhesion is reduced.

Each of the components of the coating layer is described below in detail.

Polyurethane Resin Having a Carboxyl Group and an Acid Value of 30 to 50 mgKOH/g The polyurethane resin having a carboxyl group refers to a urethane resin that is synthesized using at least a polyol component and a polyisocyanate component and, if necessary, further using a chain extender etc.; and that contains a carboxyl group in the molecule or in a side chain. The "carboxyl group in the molecule" as referred to herein means that a carboxyl group is present in the main chain or at least at one end of the polyurethane resin. The "carboxyl group in the side chain" as referred to herein means a carboxyl group introduced in a branched chain of the polyurethane resin that is obtained by synthesizing or polymerizing the starting material components, such as those mentioned above, at least one of which has three or more terminal functional groups.

The polyurethane resin having a carboxyl group in the present invention is obtained by mainly using a carboxyl-containing polyol component as a urethane component.

Examples of carboxyl-containing polyol components include relatively high molecular weight polyols, such as carboxyl-containing polyalkylene glycols, carboxyl-containing acrylic polyols, carboxyl-containing polyolefin polyols, and carboxyl-containing polyester polyols; and the like. Examples further include relatively low molecular weight polyols, such as 2,2-dimethylolpropionic acid, 2,2-dimethylolbutanoic acid, 2,2-dimethylolbutyric acid, and 2,2-dimethylolvaleric acid. For introduction of carboxyl groups, dimethylolpropionic acid and dimethylolbutanoic acid are particularly preferable.

The polyurethane resin having a carboxyl group preferably has an acid value of 30 to 50 mgKOH/g, and more preferably 35 to 45 mgKOH/g. When the acid value is 30 mgKOH/g or more, adhesion to a UV-curable resin, particularly a UV-curable ink, is increased. On the other hand, an acid value of 50 mgKOH/g or less is preferable because water resistance of the coating layer is maintained and the films do not tend to adhere to each other due to moisture absorption. In order to compensate for the water solubility or water dispersibility of the polyurethane resin, other hydrophilic groups, such as hydroxyl groups, ether groups, sulfonic acid groups, phosphonic acid groups, and quaternary amine groups, may be introduced into the polyurethane resin in the present invention as long as the performance does not deteriorate.

The carboxyl groups in the polyurethane resin may be neutralized by a basic compound. The basic compound that can be used for neutralization includes alkaline metals such as sodium and potassium, alkaline earth metals such as magnesium and calcium, and organic amine compounds. Among these, organic amine compounds that readily dissociate from carboxyl groups upon heating are preferred. Examples of organic amine compounds include ammonia; $C_{1-20}$ linear or branched primary, secondary, or tertiary amines, such as methylamine, ethylamine, propylamine, isopropylamine, butylamine, 2-ethylhexylamine, cyclohexylamine, dimethylamine, diethylamine, dipropylamine, diisopropylamine, dibutylamine, trimethylamine, triethylamine, triisopropylamine, tributylamine, and ethylenediamine; cyclic amines, such as morpholine, N-alkylmorpholine, and pyridine; hydroxyl-containing amines, such as monoisopropanolamine, methylethanolamine, methylisopropanolamine, dimethylethanolamine, diisopropanolamine, diethanolamine, triethanolamine, diethylethanolamine, and triethanolamine; and the like.

Preferable examples of other polyol components used to synthesize and polymerize the urethane resin of the present invention include polycarbonate polyols. It is particularly preferable to include aliphatic polycarbonate polyols that have excellent heat resistance and hydrolysis resistance. Examples of aliphatic polycarbonate polyols include aliphatic polycarbonate diols and aliphatic polycarbonate triols. Preferably, aliphatic polycarbonate diols can be used. Examples of aliphatic polycarbonate diols used to synthesize and polymerize the urethane resin having a polycarbonate structure of the present invention include aliphatic polycarbonate diols obtained by reacting one or two or more diols with a carbonate. Examples of the diols include ethylene glycol, propylene glycol, 1,3-propanediol, 1,4-butanediol, 1,5-pentanediol, 3-methyl-1,5-pentanediol, 1,6-hexanediol, 1,9-nonanediol, 1,8-nonanediol, neopentyl glycol, diethylene glycol, dipropylene glycol, and the like. Examples of the carbonate include dimethyl carbonate, ethylene carbonate, phosgene, and the like.

The polycarbonate polyol of the present invention preferably has a number average molecular weight of 300 to 5000, more preferably 400 to 4000, and most preferably 500 to 3000. A number average molecular weight of 300 or more is preferable in terms of enhancing ink adhesion. A number average molecular weight of 3000 or less is preferable in terms of enhancing blocking resistance.

Examples of the polyisocyanates used to synthesize or polymerize the urethane resin of the present invention include aliphatic diisocyanates having an aromatic ring, such as xylene diisocyanate; alicyclic diisocyanates such as isophorone diisocyanate, 4,4-dicyclohexylmethane diisocyanate and 1,3-bis(isocyanatomethyl)cyclohexane; aliphatic diisocyanates such as hexamethylene diisocyanate and 2,2,4-trimethylhexamethylene diisocyanate; modified polyisocyanates containing isocyanurate bonds, biuret bonds, or allophanate bonds each of which is produced from diisocyanates; and polyisocyanates produced by-addition of one or more diisocyanates to, for example, trimethylolpropane. Aliphatic diisocyanates having an aromatic ring, alicyclic diisocyanates, or aliphatic diisocyanates described above are preferably used because there is no yellowing problem.

Examples of chain extenders include glycols, such as ethylene glycol, diethylene glycol, 1,4-butanediol, neopentyl glycol, and 1,6-hexanediol; polyhydric alcohols, such as glycerol, trimethylolpropane, and pentaerythritol; diamines, such as ethylenediamine, hexamethylenediamine, and piperazine; amino alcohols, such as monoethanolamine and diethanolamine; thiodiglycols, such as thiodiethylene glycol; and water. Polyols, polyamines, or the like having three or more functional groups may also be used as long as the amount thereof is small.

The polyurethane resin of the present invention may have reactive groups, such as blocked isocyanate, at one or both ends or in one or more side chains of the resin to improve toughness.

Crosslinking Agent

In the present invention, a crosslinking agent having a carboxyl group and having an acid value of 30 to 50 mgKOH/g is used. The carboxyl group of the crosslinking agent can be neutralized with a basic compound as in the case of the polyurethane resin described above. The crosslinking agent having a carboxyl group preferably has an acid value of 30 to 50 mgKOH/g, and more preferably 35 to 45 mgKOH/g. An acid value of 30 mgKOH/g or more is preferable because it improves adhesion to a UV-curable resin, in particular, a UV-curable ink. On the other hand, an acid value of 50 mgKOH/g or less is preferable because the water resistance of the coating layer after application is maintained and the films are unlikely to easily adhere to each other due to moisture absorption. In order to compensate for the water solubility or water dispersibility of the crosslinking agent of the present invention, other hydrophilic groups, such as hydroxyl groups, ether groups, sulfonic acid groups, phosphonic acid groups, and quaternary amine groups may be introduced as long as the performance does not deteriorate.

Examples of the crosslinking agent having a carboxyl group include oxazoline compounds, carbodiimide compounds, epoxy compounds, and isocyanate compounds that have one or more carboxyl groups introduced into the molecule. The carboxyl group can also be neutralized beforehand with a basic compound in order to prevent an intra- or intermolecular reaction with the carboxyl group introduced into the molecule. Among these crosslinking agents, isocyanate compounds that easily introduce a carboxyl group into the molecule are preferred, and blocked isocyanate compounds are particularly preferred.

Examples of blocking agents include bisulfite compounds such as sodium bisulfite; pyrazole compounds such as 3,5-dimethylpyrazole, 3-methylpyrazole, 4-bromo-3,5-dimethylpyrazole, and 4-nitro-3,5-dimethylpyrazole; phenol compounds such as phenol and cresol; aliphatic alcohol compounds such as methanol and ethanol; active methylene compounds such as dimethyl malonate and acetylacetone; mercaptan compounds such as butyl mercaptan and dodecyl mercaptan; acid amide compounds such as acetanilide and acetic acid amide; lactam compounds such as F-caprolactam and 5-valerolactam; acid imide compounds such as succinimide and maleimide; oxime compounds such as acetaldoxime, acetone oxime, and methyl ethyl ketoxime; amine compounds such as diphenylaniline, aniline, and ethyleneimine; and like blocking agents.

The lower limit of the boiling point of the blocking agent of the blocked isocyanate is preferably 150° C., more preferably 160° C., even more preferably 180° C., particularly preferably 200° C., and most preferably 210° C. The higher the boiling point of the blocking agent, the more the volatilization of the blocking agent by application of heat is suppressed in the drying process after application of the coating liquid, and also in the film-forming process in the case of an in-line coating method, and the more the formation of minute irregularities on the coating surface is suppressed, thereby improving transparency of the film. Although the upper limit of the boiling point of the blocking agent is not particularly limited, about 300° C. seems to be the upper limit in terms of productivity. Since the boiling point is related to the molecular weight, a blocking agent having a high molecular weight is preferably used in order to increase the boiling point of the blocking agent. The blocking agent preferably has a molecular weight of 50 or more, more preferably 60 or more, and even more preferably 80 or more.

The upper limit of the dissociation temperature of the blocking agent is preferably 200° C., more preferably 180° C., even more preferably 160° C., particularly preferably 150° C., and most preferably 120° C. The blocking agent dissociates upon application of heat in the drying process after application of the coating liquid, or in the film-forming process in the case of an in-line coating method, to produce a regenerated isocyanate group. Therefore, the crosslinking reaction with a urethane resin or the like proceeds to improve the adhesion. If the dissociation temperature of the blocked isocyanate is at or below the above-mentioned temperature, the dissociation of the blocking agent progresses sufficiently, resulting in good adhesion, in particular, good wet-heat resistance.

Examples of blocking agents that have a dissociation temperature of 120° C. or less and a boiling point of 150° C. or more and that can be used for the blocked isocyanate of the present invention include sodium bisulfite, 3,5-dimethylpyrazole, 3-methylpyrazole, dimethyl malonate, diethyl malonate, acetone oxime, and methyl ethyl ketoxime as mentioned above. Of these, pyrazole-based compounds, such as 3,5-dimethylpyrazole and 3-methylpyrazole, are preferred in terms of wet-heat resistance and yellowing resistance.

The blocked isocyanate preferably has two or more functional groups. A blocked isocyanate having three or more functional groups is more preferable in terms of crosslinkability of the coating film.

The polyisocyanate having three or more functional groups, which is a precursor of the blocked isocyanate of the present invention, can be preferably obtained from an isocyanate monomer. Examples include biurets, isocyanurates, and adducts obtained by modifying an isocyanate monomer having two isocyanate groups, such as aromatic diisocyanate, aliphatic diisocyanate, aromatic aliphatic diisocyanate, or alicyclic diisocyanate.

The biuret is a self-condensate with a biuret bond formed by self-condensation of an isocyanate monomer. Examples include a biuret of hexamethylene diisocyanate, and the like.

The isocyanurate is a trimer of an isocyanate monomer. Examples include a trimer of hexamethylene diisocyanate, a trimer of isophorone diisocyanate, a trimer of tolylene diisocyanate, and the like.

The adduct is an isocyanate compound that contains three or more functional groups and that is obtained by reacting an isocyanate monomer with a low-molecular-weight compound containing three or more active hydrogen functional groups. Examples include a compound obtained by reacting trimethylolpropane with hexamethylene diisocyanate, a compound obtained by reacting trimethylolpropane with tolylene diisocyanate, a compound obtained by reacting trimethylolpropane with xylylene diisocyanate, a compound obtained by reacting trimethylolpropane with isophorone diisocyanate, and the like.

Examples of the isocyanate monomer include aromatic diisocyanates, such as 2,4-tolylene diisocyanate, 2,6-tolylene diisocyanate, 4,4'-diphenylmethane diisocyanate, 2,4'-diphenylmethane diisocyanate, 2,2'-diphenylmethane diisocyanate, 1,5-naphthylene diisocyanate, 1,4-naphthylene diisocyanate, phenylene diisocyanate, tetramethylxylylene diisocyanate, 4,4'-diphenylether diisocyanate, 2-nitrodiphenyl-4,4'-diisocyanate, 2,2'-diphenylpropane-4,4'-diisocyanate, 3,3'-dimethyldiphenylmethane-4,4'-diisocyanate, 4,4'-diphenylpropane diisocyanate, 3,3'-dimethoxydiphenyl-4,4'-diisocyanate, and xylenediisocyanate; alicyclic diisocyanates, such as isophorone diisocyanate, 4,4-dicyclohexylmethane diisocyanate, and 1,3-bis(isocyanatomethyl)cyclohexane; and aliphatic diisocyanates, such as hexamethylene diisocyanate and 2,2,4-trimethylhexamethylene diisocyanate. The aliphatic and alicyclic diisocyanates and modified products thereof are preferred in terms of transparency, yellowing resistance, adhesion, and wet-heat resistance.

In the present invention, one or more other resins can be used with the polyurethane resin and the crosslinking agent as long as they do not affect the performance. Examples of such other resins used with the polyurethane resin include polyurethane not containing carboxyl groups, polyester resins, acrylic resins, cellulose resins, polyolefin resins, polyacetal resins, and the like. Among these resins, a polyester resin is particularly preferred because its use with the polyurethane resin improves adhesion to UV-curable resins. When a polyester resin is used with the polyurethane resin, the content of the polyester resin can be 1.5 times or more higher than the combined content of the carboxyl-containing polyurethane resin and the carboxyl-containing crosslinking agent. Since a polyester resin has a better affinity to the substrate polyester resin than the carboxyl-containing polyurethane resin or the carboxyl-containing crosslinking agent, the polyester resin can be easily localized to the substrate side in the thickness direction, which increases the adhesion to the substrate, and the carboxyl-containing polyurethane resin and the carboxyl-containing crosslinking agent localized in the surface of the coating layer exhibit a synergistic effect of increasing the adhesion to UV-curable resin.

Polyester Resin

The polyester resin used together to form the coating layer in the present invention may be linear; however, it is preferably a polyester resin that contains as constituents a dicarboxylic acid and either a diol (glycol) having a branched structure or a diol having one or more ether bonds. Examples of the dicarboxylic acid as referred to herein mainly include aliphatic dicarboxylic acids such as adipic acid and sebacic acid; and aromatic dicarboxylic acids such as terephthalic acid, isophthalic acid, phthalic acid, and 2,6-naphthalenedicarboxylic acid. The branched glycol refers to a diol having a branched alkyl group. Examples include 2,2-dimethyl-1,3-propanediol, 2-methyl-2-ethyl-1,3-propanediol, 2-methyl-2-butyl-1,3-propanediol, 2-methyl-2-propyl-1,3-propanediol, 2-methyl-2-isopropyl-1,3-propanediol, 2-methyl-2-n-hexyl-1,3-propanediol, 2,2-diethyl-1,3-propanediol, 2-ethyl-2-n-butyl-1,3-propanediol, 2-ethyl-2-n-hexyl-1,3-propanediol, 2,2-di-n-butyl-1,3-propanediol, 2-n-butyl-2-propyl-1,3-propanediol, 2,2-di-n-hexyl-1,3-propanediol, and the like.

Furthermore, diols containing one or more ether bonds include condensation products of alkylene glycols such as diethylene glycol, triethylene glycol, and dipropylene glycol; and ethylene oxide adducts of bisphenol compounds, propylene oxide adducts of bisphenol compounds, and the like. The number of ether bonds in the molecule is not particularly limited, but is preferably 4 or less, and more preferably 2 or less because the presence of a large number of ether bonds reduces the strength or the glass transition temperature of the polyester resin.

In the polyester resin, a branched glycol component or a diol component containing one or more ether bonds, which are more preferred embodiments described above, is considered to be present in a proportion of 10 mol % or more, and more preferably 20 mol % or more, based on the entire glycol component. A content of 10 mol % or more is preferable because the crystallinity is not too high and adhesion of the coating layer is maintained. The upper limit of the glycol component content in the entire glycol component is preferably 80 mol % or less, and more preferably 70 mass % or less. A glycol component content of 80 mol % or less is preferable because the concentration of oligomers as a by-product is unlikely to increase, which maintains the transparency of the coating layer. As a glycol component other than the compounds mentioned above, ethylene glycol is most preferable. Propylene glycol, butanediol, hexanediol, 1,4-cyclohexanedimethanol, or the like may be used as long as the amount thereof is small.

The dicarboxylic acid as a constituent component of the polyester resin is most preferably terephthalic acid or isophthalic acid. In addition to the above dicarboxylic acid, 5-sulfoisophthalic acid or the like in an amount of 1 to 10 mol % is preferably subjected to copolymerization in order to impart water dispersibility to the copolyester resin. Examples of such compounds include sulfoterephthalic acid, 5-sulfoisophthalic acid, 5-sodium sulfoisophthalate, and the like.

When the total solids content of the resin and crosslinking agent in the coating liquid for forming the coating layer is defined as 100 mass %, a polyester resin content of 10 mass % or more is preferable because it provides good adhesion between the coating layer and the polyester film substrate. The upper limit of the polyester resin content is preferably 65 mass % or less, and more preferably 60 mass % or less. A polyester resin content of 70 mass % or less is preferable because it provides good heat resistance after ink processing.

Resins other than the polyester resin described above can also be used in the coating layer as long as the performance of the film is not impaired. A typical example of resins other than the polyester resin is a polyurethane resin containing a carboxyl group. Other resins may also be included, or only a polyurethane resin containing a carboxyl group may be used. In such a case, when the total solids content of the resin and the crosslinking agent in the coating liquid for forming the coating layer is 100 mass %, the content of the resin other than the polyester resin is preferably 40 mass % or less, more preferably 30 mass % or less, and particularly preferably 20 mass % or less. The total content of the polyester resin and the resin other than the polyester resin is preferably 70 mass % or less. The content of the polyurethane resin and the content of the crosslinking agent in the coating liquid for forming the coating layer are each preferably 3 mass % or more, based on the total solids content of the resin and the crosslinking agent.

A content of 3 mass % or more is preferable because it provides effects of high adhesion to UV-curable resins and high adhesion to coating agents such as UV-curable inks. The content is more preferably in the range of 3.5 to 90 mass %, more preferably 7 to 80 mass %, and particularly preferably 10.5 to 70 mass %.

Additives

The coating layer in the present invention may contain known additives, such as surfactants, antioxidants, heat-resistant stabilizers, weathering stabilizers, ultraviolet absorbers, organic lubricants, pigments, dyes, organic or inorganic particles, antistatic agents, and nucleating agents, as long as the effect of the present invention is not impaired.

In a preferable embodiment of the present invention, particles are added to the coating layer in order to further improve the blocking resistance of the coating layer. In the present invention, examples of the particles contained in the coating layer include inorganic particles of titanium oxide, barium sulfate, calcium carbonate, calcium sulfate, silica, alumina, talc, kaolin, clay, or mixtures thereof, or combinations thereof with other general inorganic particles, such as calcium phosphate, mica, hectorite, zirconia, tungsten oxide, lithium fluoride, and calcium fluoride; organic polymer particles such as styrene, acrylic, melamine, benzoguanamine, silicone, and like polymer particles; and the like.

The average particle size of the particles in the coating layer (average particle size based on the number of particles measured with a scanning electron microscope (SEM); the same hereinbelow) is preferably 0.04 to 2.0 μm, and more preferably 0.1 to 1.0 μm. Inert particles having an average particle size of 0.04 μm or more are preferred because they facilitate formation of unevenness on the film surface, resulting in improved handling properties of the film, such as sliding properties and winding properties, and good processability during bonding. On the other hand, inert particles having an average particle size of 2.0 μm or less are preferred because the particles are less likely to drop off. The particle concentration in the coating layer is preferably 1 to 20 mass %, based on the solids content of the coating layer.

The average particle size of the particles is measured by a method comprising observing 30 particles in the cross-section of the laminated polyester film with a scanning electron microscope and defining the average value of the particle sizes of the particles as the average particle size.

The shape of the particles is not particularly limited as long as it satisfies the object of the present invention, and spherical particles or non-spherical particles having an irregular shape can be used. The particle size of particles having an irregular shape can be calculated as an equivalent circle diameter. The equivalent circle diameter is a value obtained by dividing the area of the observed particle by n, calculating the square root, and doubling the value of the square root.

Production of Laminated Polyester Film

The method for producing the laminated polyester film of the present invention is described, taking a case using a polyethylene terephthalate (which hereinbelow may be briefly referred to as "PET") film substrate as an example. However, naturally, the method of the present invention is not limited to this example.

After a PET resin is sufficiently dried in vacuum, the resin is fed into an extruder, and the PET resin melted at about 280° C. is melt-extruded in a sheet form from a T-die onto a rotating cooling roll, followed by cooling to solidify the sheet by an electrostatic application, thus forming an unstretched PET sheet. The unstretched PET sheet may be single-layered, or may be multilayered by a coextrusion method.

The obtained unstretched PET sheet is subjected to uniaxial stretching or biaxial stretching for crystal orientation. For example, in the case of biaxial stretching, the unstretched PET sheet is stretched 2.5- to 5.0-fold in the longitudinal direction with rolls heated to 80 to 120° C. to obtain a uniaxially stretched PET film; the film is then held with clips at the ends thereof and guided to a hot-air zone heated to 80 to 180° C., followed by stretching 2.5- to 5.0-fold in the width direction. In the case of uniaxial stretching, the unstretched PET sheet is stretched 2.5- to 5.0-fold in a tenter. After stretching, the resulting film is guided to a heat treatment zone and a heat treatment is performed to complete crystal orientation.

The lower limit of the temperature of the heat treatment zone is preferably 170° C., and more preferably 180° C. A heat treatment zone temperature of 170° C. or more is preferred because curing sufficiently proceeds, good blocking resistance is obtained in the presence of liquid water, and drying does not take a long time. On the other hand, the upper limit of the temperature of the heat treatment zone is preferably 250° C., and more preferably 240° C. A heat treatment zone temperature of 240° C. or less is preferred because it reduces the likelihood that physical properties of the film deteriorate.

The coating layer can be formed after the production of the film or in the production process. In particular, in view of productivity, the coating layer is preferably formed at any stage of the production process of the film; that is, the coating layer is preferably formed by applying the coating liquid to at least one surface of the unstretched or uniaxially stretched PET film and stretching in at least one axial direction and heat-treating the resulting film.

The coating liquid may be applied to the PET film by using any known method. Examples of usable methods include reverse roll coating, gravure coating, kiss coating, die coating, roll brush coating, spray coating, air knife coating, wire bar coating, pipe doctor, impregnation coating, curtain coating, and like methods. These methods may be used singly or in combination to apply the coating liquid.

In the present invention, the thickness of the coating layer can be appropriately determined within the range of 0.001 to 2.00 μm. In order to achieve both processability and adhesion, the thickness is preferably within the range of 0.01 to 1.00 μm, more preferably 0.02 to 0.80 μm, and even more preferably 0.05 to 0.50 μm. A coating layer thickness of 0.001 μm or more is preferred due to good adhesion. A coating layer thickness of 2.00 μm or less is preferred because blocking is less likely to occur.

The upper limit of the haze of the laminated polyester film of the present invention is preferably 2.5%, more preferably 2.0%, even more preferably 1.5%, and particularly preferably 1.2%. The laminated polyester film having a haze of 2.5% or less is preferred in terms of transparency, and can be suitably used for optical films that require transparency.

A lower haze value is generally preferable. However, a haze of 0.1% or more is also preferable, and even a haze of 0.2% or more is also preferable.

EXAMPLES

Next, the present invention is described below in more detail with reference to Examples and Comparative Examples. However, the present invention is not limited to the following Examples. The evaluation methods used in the present invention are first explained below.

(1) Haze

The haze of the obtained laminated polyester films was measured using a turbidimeter (NDH5000, produced by Nippon Denshoku Industries, Co., Ltd.) in accordance with JIS K 7136: 2000.

(2) Acid Value

The acid value of the resin and crosslinking agent was measured by the titration method described in JIS K1557-5:2007.

When carboxyl groups neutralized with amine or the like were to be measured, measurement was performed after amine or the like was removed by a high-temperature treatment or a treatment with hydrochloric acid or the like is performed beforehand to release or remove amine or the like. When the crosslinking agent is to be measured, reactive groups such as isocyanate groups were reacted with amine or the like beforehand and then the measurement was performed. If the resin to be measured had poor solubility in isopropanol for use as a solvent, N-methylpyrrolidone was used in place of isopropanol. In any treatment such as those mentioned above, measurements for controls were fully performed.

(3) Blocking Resistance

Two sheets of the same film sample were superposed on top of one another in such a manner that their coating layer surfaces faced each other. A load of 98 kPa was applied so that the two sheets of the same film sample were in close contact with each other, and allowed to stand in an atmosphere of 50° C. for 24 hours. The two sheets of the same film sample was then detached from each other, and the detached state was evaluated according to the following criteria.

A: The two sheets can easily be detached from each other, without any transfer of one coating layer to another.
B: The coating layers are basically maintained; however, the surface layer of one coating layer is partially transferred to the opposing surface.
C: The two sheets are tightly adhered to each other in such a manner that the sheets cannot be detached from each other; or even if the two sheets can be detached from each other, cleavage in the film substrates occurs.

(4) UV-Curable Ink Adhesion

A print was formed on a coating layer of a laminated polyester film using a UV-curable ink (trade name "BEST CURE UV161 Indigo S" or "BEST CURE UV161 White S"; both produced by T&K TOKA Co., Ltd.) in an amount of 4 on the scale of an ink pipette with two split rollers of a printing machine (trade name "RI Tester," produced by Akira Seisakusho Co., Ltd.). Subsequently, the film coated with the ink layer was irradiated with 100 or 40 mJ/cm$^2$ of UV light using a high-pressure mercury lamp to thereby cure the UV-curable ink. Subsequently, cuts that reached the film substrate through the ink layer were made to form a grid of 100 squares on the ink layer surface using a cutter guide with spaced intervals of 2 mm. Subsequently, Cellophane adhesive tape (produced by Nichiban Co., Ltd., No. 405, width: 24 mm) was firmly applied to the cut surface in the form of a grid to ensure complete adhesion. The Cellophane adhesive tape was then vertically peeled off from the ink layer surface of the ink laminated film, and the number of squares peeled off from the ink layer surface of the ink laminated film was visually counted to determine the adhesion between the ink layer and the film substrate according to the following formula. The squares that were partially peeled off were also counted as being peeled off.

Ink adhesion (%)=100−(Number of squares that peeled off)

The ink adhesion was evaluated according to the following criteria.
A: 100%
B: 96 to 99%
C: 80 to 95%
D: less than 80%
In the evaluation criteria, A and B were graded as acceptable.

(5) Adhesion to Hardcoat Layer

A UV-curable hard coating agent, Opstar Z7503 (produced by Arakawa Chemical Industries, Ltd.), was applied to the coating layer of the laminated polyester film using a #5 wire bar, and dried at 80° C. for 1 minute. The film to which the hard coating agent was applied was irradiated with 100 mJ/cm$^2$ of ultraviolet rays using a high-pressure mercury lamp to thereby obtain a hard-coated film having a thickness of the hardcoat layer of 4 μm.

Subsequently, cuts that reached the film substrate through the hardcoat layer were made to form a grid of 100 squares using a cutter guide with spaced intervals of 2 mm. Subsequently, Cellophane adhesive tape (produced by Nichiban Co., Ltd., No. 405, width: 24 mm) was firmly applied to the cut surface in the form of a grid to ensure complete adhesion. The Cellophane adhesive tape was then vertically peeled off from the hardcoat layer surface of the hard-coated laminated film. After the adhesive tape peeling-off operation was performed five times at the same location, the number of squares peeled off from the hardcoat layer surface of the hard-coated laminated film was visually counted to determine the adhesion between the hardcoat layer and the film substrate according to the following formula. The squares that partially peeled off were also counted as being peeled off.

Adhesion to hardcoat layer (%)=100−(Number of squares that peeled off)

The adhesion between the hardcoat layer and the film substrate was evaluated according to the following criteria.
A: 100%
B: 96 to 99%
C: 80 to 95%
D: less than 80%
In the evaluation criteria, A and B were graded as acceptable.

(6) Wet-Heat Resistance

A UV-curable ink-coated film (a product cured by UV-irradiation at 100 mJ/cm$^2$ after application of BEST CURE UV161 White) and a hardcoat coated film, which were prepared in the same manner as in (4) and (5) above, were allowed to stand in an environment of 80° C. and 80% RH for 500 hours with the coated surface being disposed vertically, and with no other film or other objects being in contact with the coated surface. After the treatment, the film was allowed to stand in an environment of 23° C. and 65% RH for 10 minutes with no other film or other objects being in contact with the coated surface. Immediately after the time elapsed, the adhesion of the coated surface was evaluated in the same manner as described above.

Polymerization of Polyurethane Resin A-1

82.8 parts by mass of hydrogenated m-xylylene diisocyanate, 25.0 parts by mass of dimethylolpropanoic acid, 21.0 parts by mass of 1,6-hexanediol, and 150.0 parts by mass of polyester diol comprising adipic acid and 1,4-butanediol and having a number average molecular weight of 2000, and 110 parts by mass of methyl ethyl ketone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours and was confirmed to have reached a predetermined amine equivalent. Subsequently, after the temperature of the reaction mixture was reduced to 40° C., 19.8 parts by mass of triethylamine was added to obtain a polyurethane polymer solution. Subsequently, 500 g of water was added to a reaction vessel equipped with a homodisper capable of high-speed stirring, and the temperature was adjusted to 25° C. While the resulting mixture was mixed by stirring at 2000 $min^{-1}$, the polyurethane polymer solution was added to obtain an aqueous dispersion. The solvent methyl ethyl ketone was then removed under reduced pressure. The concentration was adjusted with water to prepare a solution with a solids content of 35 mass % containing a polyurethane resin (A-1) with an acid value of 37.5 mgKOH/g.

Polymerization of Polyurethane Resin A-2

63.0 parts by mass of hydrogenated m-xylylene diisocyanate, 21.0 parts by mass of dimethylolpropanoic acid, 147.0 parts by mass of a polycarbonate diol having a number average molecular weight of 2000 (derived from 1,6-hexanediol), and 110 parts by mass of methyl ethyl ketone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours and confirmed to have reached a predetermined amine equivalent. Subsequently, after the temperature of the reaction mixture was reduced to 40° C., 16.6 parts by mass of triethylamine was added to obtain a polyurethane polymer solution. Subsequently, 500 g of water was added to a reaction vessel equipped with a homodisper capable of high-speed stirring, and the temperature was adjusted to 25° C. While the resulting mixture was mixed by stirring at 2000 $min^{-1}$, the polyurethane polymer solution was added to obtain an aqueous dispersion. The solvent methyl ethyl ketone was then removed under reduced pressure. The concentration was adjusted with water to prepare a solution with a solids content of 35 mass % containing a polyurethane resin (A-2) with an acid value of 36.3 mgKOH/g.

Polymerization of Polyurethane Resin A-3

64.5 parts by mass of hydrogenated diphenylmethane diisocyanate, 21.5 parts by mass of dimethylolpropionic acid, 11.2 parts by mass of neopentyl glycol, 150.5 parts by mass of a polycarbonate diol (derived from 1,6-hexanediol) having a number average molecular weight of 2000, and 110 parts by mass of methyl ethyl ketone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours and confirmed to have reached a predetermined amine equivalent. Subsequently, after the temperature of the reaction mixture was reduced to 40° C., 17.0 parts by mass of triethylamine was added to obtain a polyurethane polymer solution. Subsequently, 500 g of water was added to a reaction vessel equipped with a homodisper capable of high-speed stirring, and the temperature was adjusted to 25° C. While the resulting mixture was mixed by stirring at 2000 $min^{-1}$, the polyurethane polymer solution was added to obtain an aqueous dispersion. The solvent methyl ethyl ketone was then removed under reduced pressure. The concentration was adjusted with water to prepare a solution with a solids content of 35 mass % containing a polyurethane resin (A-3) with an acid value of 36.0 mgKOH/g.

Polymerization of Polyurethane Resin A-4

83.4 parts by mass of hydrogenated m-xylylene diisocyanate, 16.9 parts by mass of dimethylolpropionic acid, 28.4 parts by mass of 1,6-hexanediol, 151.0 parts by mass of polyester diol comprising adipic acid and 1,4-butanediol and having an average molecular weight of 2000, and 110 parts by mass of methyl ethyl ketone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours and confirmed to have reached a predetermined amine equivalent. Subsequently, after the temperature of the reaction mixture was reduced to 40° C., 13.3 parts by mass of triethylamine was added to obtain a polyurethane polymer solution. Subsequently, 500 g of water was added to a reaction vessel equipped with a homodisper capable of high-speed stirring, and the temperature was adjusted to 25° C. While the resulting mixture was mixed by stirring at 2000 $min^{-1}$, the polyurethane polymer solution was added to obtain an aqueous dispersion. The solvent methyl ethyl ketone was then removed under reduced pressure. The concentration was adjusted with water to prepare a solution with a solids content of 35 mass % containing a polyurethane resin (A-4) with an acid value of 25.3 mgKOH/g.

Polymerization of Polyurethane Resin A-5

104.9 parts by mass of hydrogenated m-xylylene diisocyanate, 41.8 parts by mass of dimethylolpropionic acid, 19.0 parts by mass of 1,6-hexanediol, 152.0 parts by mass of polyester diol comprising adipic acid and 1,4-butanediol and having a number average molecular weight of 2,000, and 110 parts by mass of methyl ethyl ketone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours and confirmed to have reached a predetermined amine equivalent. Subsequently, after the temperature of the reaction mixture was reduced to 40° C., 33.1 parts by mass of triethylamine was added to obtain a polyurethane polymer solution. Subsequently, 500 g of water was added to a reaction vessel equipped with a homodisper capable of high-speed stirring, and the temperature was adjusted to 25° C. While the resulting mixture was mixed by stirring at 2000 $min^{-1}$, the polyurethane polymer solution was added to obtain an aqueous dispersion. The solvent methyl ethyl ketone was then removed under reduced pressure. The concentration was adjusted with water to prepare a solution with a solids content of 35 mass % containing a polyurethane resin (A-5) with an acid value of 55.0 mgKOH/g.

Polymerization of Polyurethane Resin A-6

45.0 parts by mass of hydrogenated m-xylylene diisocyanate, 20.0 parts by mass of 1,6-hexanediol, 149.0 parts by mass of polyethylene glycol having a number average molecular weight of 2000, and 110 parts by mass of methyl ethyl ketone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours and confirmed to have reached a predetermined amine equivalent. Subsequently, after the temperature of the reaction mixture was reduced to 40° C. to obtain a polyurethane polymer solution. 500 g of water was added to a reaction vessel equipped with a homodisper capable of high-speed stirring, and the temperature was adjusted to 25° C. While the resulting mixture was mixed by stirring at 2000 min$^{-1}$, the polyurethane polymer solution was added to obtain an aqueous dispersion. The solvent methyl ethyl ketone was then removed under reduced pressure. The concentration was adjusted with water to prepare a solution with a solids content of 35 mass % containing a polyurethane resin (A-6) with an acid value of 0.2 mgKOH/g.

Polymerization of Polyurethane Resin A-7

43.8 parts by mass of hydrogenated diphenylmethane diisocyanate, 12.9 parts by mass of dimethylolbutanoic acid, and 153.4 parts by mass of a polycarbonate diol (derived from 1,6-hexanediol) having a number average molecular weight of 2000, and 110 parts by mass of methyl ethyl ketone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 3 hours and confirmed to have reached a predetermined amine equivalent. Subsequently, after the temperature of the reaction mixture was reduced to 40° C., 8.8 parts by mass of triethylamine was added to obtain a polyurethane polymer solution. Subsequently, 500 g of water was added to a reaction vessel equipped with a homodisper capable of high-speed stirring, and the temperature was adjusted to 25° C. While the resulting mixture was mixed by stirring at 2000 min$^{-1}$, the polyurethane polymer solution was added to obtain an aqueous dispersion. The solvent methyl ethyl ketone was then removed under reduced pressure. The concentration was adjusted with water to prepare a solution with a solids content of 35 mass % containing a polyurethane resin (A-7) with an acid value of 23.1 mgKOH/g.

Polymerization of Polyurethane Resin A-8

68.0 parts by mass of hydrogenated diphenylmethane diisocyanate, 19.8 parts by mass of dimethylolpropionic acid, 148.0 parts by mass of a polycarbonate diol (derived from 1,6-hexanediol) having a number average molecular weight of 2000, and 110 parts by mass of methyl ethyl ketone as a solvent were placed into a four-necked flask equipped with a stirrer, a Dimroth condenser, a nitrogen introduction tube, a silica gel drying tube, and a thermometer. The resulting mixture was stirred at 75° C. in a nitrogen atmosphere for 2 hours and confirmed to have reached a predetermined amine equivalent. Subsequently, 6.6 parts by mass of 2-butanone oxime was added, and the reaction was stirred for another hour. After the temperature of this reaction solution was reduced to 40° C., 15.7 parts by mass of triethylamine was added to obtain a polyurethane polymer solution. Subsequently, 500 g of water was added to a reaction vessel equipped with a homodisper capable of high-speed stirring, and the temperature was adjusted to 25° C. While the resulting mixture was mixed by stirring at 2000 min$^{-1}$, the polyurethane polymer solution was added to obtain an aqueous dispersion. 1.1 parts by mass of a 10 mass % ethylenediamine aqueous solution was added with stirring. The solvent methyl ethyl ketone was then removed under reduced pressure. The concentration was adjusted with water to prepare a solution with a solids content of 35 mass % containing a polyurethane resin (A-8) with an acid value of 32.0 mgKOH/g.

Synthesis of Crosslinking Agent B-1

59.5 parts by mass of hexamethylene diisocyanate, 10.7 parts by mass of neopentyl glycol, 11.0 parts by mass of dimethylolbutanoic acid, and 20.0 parts by mass of N-methylpyrrolidone as a solvent were placed in a flask equipped with a stirrer, a thermometer, and a reflux condenser tube. The resulting mixture was stirred at 80° C. in a nitrogen atmosphere for 3 hours and confirmed to have reached a predetermined amine equivalent. Subsequently, 29.9 parts by mass of 2-butanone oxime was added dropwise to the reaction solution, and the reaction mixture was maintained at 80° C. under a nitrogen atmosphere for 1 hour. The reaction mixture was then subjected to infrared spectrum measurement and the disappearance of the isocyanate group absorption peak was confirmed. The temperature of the reaction mixture was then reduced to 40° C., and 7.9 parts by mass of triethylamine was added. After stirring for 1 hour, an appropriate amount of water was added to prepare a blocked isocyanate crosslinking agent (B-1) solution with a solids content of 40 mass %. The solids content of the crosslinking agent (B-1) had an acid value of 37.6 mgKOH/g.

Synthesis of Crosslinking Agent B-2

66.6 parts by mass of a polyisocyanate compound having an isocyanurate structure (Duranate TPA, produced by Asahi Kasei Corporation) prepared using hexamethylene diisocyanate as a starting material and 17.5 parts by mass of N-methylpyrrolidone were placed in a flask equipped with a stirrer, a thermometer, and a reflux condenser tube, and 21.7 parts by mass of 3,5-dimethylpyrazole was added dropwise. The resulting mixture was maintained at 70° C. in a nitrogen atmosphere for 1 hour. 9.0 parts by weight of dimethylol propionic acid was added dropwise. After the reaction mixture was subjected to infrared spectrum measurement and the disappearance of the isocyanate group absorption peak was confirmed, 6.3 parts by mass of N,N-dimethylethanolamine was added. After stirring for 1 hour, an appropriate amount of water was added to prepare a blocked isocyanate crosslinking agent (B-2) solution with a solids content of 40 mass %. The solids content of the crosslinking agent (B-2) had an acid value of 41.2 mgKOH/g.

Synthesis of Crosslinking Agent B-3

150.0 parts by mass of water and 250.0 parts by mass of methoxypropyl alcohol were placed in a flask equipped with a stirrer, a thermometer, and a reflux condenser tube. The resulting mixture was heated to 80° C. in a nitrogen atmosphere. A monomer mixture comprising 126.0 parts by mass of methyl methacrylate, 210.0 parts by mass of 2-isopropenyl-2-oxazoline, and 53.0 parts by mass of triethylamine methacrylate, and a polymerization initiator solution consisting of 18.0 parts by mass of 2,2'-azobis(2-amidinopropane) dihydrochloride as a polymerization initiator and 170.0 parts by mass of water were individually added from dropping funnels over a period of 2 hours under a nitrogen atmosphere while maintaining the temperature in the flask at 80° C. After the dropwise addition, the reaction mixture was stirred at 80° C. for 5 hours, and then cooled to room temperature. An appropriate amount of water was added to prepare an oxazoline crosslinking agent (B-3) solution with a solids content of 40 mass %. The solids content of the crosslinking agent (B-3) had an acid value of 39.8 mgKOH/g.

Polymerization of Crosslinking Agent B-4

65.0 parts by mass of a polyisocyanate compound having an isocyanurate structure (Duranate TPA, produced by Asahi Kasei Corporation) prepared using hexamethylene diisocyanate as a starting material, 17.5 parts by mass of N-methylpyrrolidone, 29.2 parts by mass of 3,5-dimethylpyrazole, and 21.9 parts by mass of polyethylene glycol monomethyl ether having an average molecular weight of 500 were placed in a flask equipped with a stirrer, a thermometer, and a reflux condenser tube. The resulting mixture was maintained in a nitrogen atmosphere at 70° C. for 2 hours. 4.0 parts by mass of trimethylolpropane was then added dropwise. After the reaction mixture was subjected to infrared spectrum measurement and the disappearance of the isocyanate group absorption peak was confirmed, 280.0 parts by mass of water was added. An appropriate amount of water was added to prepare a block polyisocyanate crosslinking agent (B-4) solution with a solids content of 40 mass %. The solids content of the crosslinking agent (B-4) had an acid value of 0.0 mgKOH/g.

Polymerization of Crosslinking Agent B-5

66.04 parts by mass of a polyisocyanate compound having an isocyanurate structure (Duranate TPA, produced by Asahi Kasei Corporation) prepared using hexamethylene diisocyanate as a starting material and 17.50 parts by mass of N-methylpyrrolidone were placed in a flask equipped with a stirrer, a thermometer, and a reflux condenser tube, and 25.19 parts by mass of 3,5-dimethylpyrazole was added dropwise. The resulting mixture was maintained at 70° C. in a nitrogen atmosphere for 1 hour. Thereafter, 5.27 parts by weight of dimethylol propionic acid was added dropwise. After the reaction mixture was subjected to infrared spectrum measurement and the disappearance of the isocyanate group absorption peak was confirmed, 5.59 parts by mass of N,N-dimethylethanolamine and 132.5 parts by mass of water were added. An appropriate amount of water was added to prepare a solution of a blocked polyisocyanate crosslinking agent (B-5) with a solids content of 40 mass %. The solids content of the crosslinking agent (B-5) had an acid value of 22.8 mgKOH/g.

Synthesis of Crosslinking Agent B-6

59.5 parts by mass of hexamethylene diisocyanate, 6.8 parts by mass of neopentyl glycol, 16.6 parts by mass of dimethylol butanoic acid, and 20.0 parts by mass of N-methylpyrrolidone as a solvent were placed in a flask equipped with a stirrer, a thermometer, and a reflux condenser tube. The resulting mixture was stirred at 80° C. in a nitrogen atmosphere for 3 hours and confirmed to have reached a predetermined amine equivalent. Subsequently, 30.3 parts by mass of 2-butanone oxime was added dropwise to the reaction mixture, and the reaction mixture was maintained at 80° C. under a nitrogen atmosphere for 1 hour. The reaction mixture was then subjected to infrared spectrum measurement and the disappearance of the isocyanate group absorption peak was confirmed. The temperature of the reaction mixture was then reduced to 40° C., and 11.9 parts by mass of triethylamine was added. After stirring for 1 hour, an appropriate amount of water was added to prepare a blocked isocyanate crosslinking agent (B-6) solution with a solids content of 40 mass %. The solids content of the crosslinking agent (B-6) had an acid value of 55.4 mgKOH/g.

Preparation of Polyester Resin C-1

194.2 parts by mass of dimethyl terephthalate, 184.5 parts by mass of dimethyl isophthalate, 14.8 parts by mass of dimethyl-5-sodium sulfoisophthalate, 233.5 parts by mass of diethylene glycol, 136.6 parts by mass of ethylene glycol, and 0.2 parts by mass of tetra-n-butyl titanate were placed in a stainless steel autoclave equipped with a stirrer, a thermometer, and a partial reflux condenser. A transesterification reaction was performed at a temperature of 160 to 220° C. for 4 hours. Subsequently, the temperature was raised to 255° C., and the pressure in the reaction system was gradually reduced. A reaction was then performed at a reduced pressure of 30 Pa for one hour and a half, thus obtaining a copolyester resin (C-1). The obtained polyester resin (C-1) was pale yellow and transparent. The reduced viscosity of the polyester resin (C-1) was measured to be 0.70 dl/g.

Further, 15 parts by mass of the polyester resin (C-1) and 15 parts by mass of ethylene glycol n-butyl ether were placed in a reactor equipped with a stirrer, a thermometer, and a reflux condenser. The resulting mixture was heated at 110° C. and stirred to dissolve the resin. After the resin was completely dissolved, 70 parts by mass of water was gradually added to the polyester solution while stirring. After the addition, the resulting liquid was cooled to room temperature while stirring. An appropriate amount of water was added to prepare a solution of the polyester resin (C-1) with a solids content of 30 mass %. The solids content of the polyester resin (C-1) had an acid value of 0.9 mgKOH/g.

Preparation of Polyester Resin C-2

194.2 parts by mass of dimethyl terephthalate, 194.2 parts by mass of dimethyl isophthalate, 233.5 parts by mass of diethylene glycol, 136.6 parts by mass of ethylene glycol, and 0.2 parts by mass of tetra-n-butyl titanate were placed in a stainless steel autoclave equipped with a stirrer, a thermometer, and a partial reflux condenser. A transesterification reaction was performed at a temperature of 160 to 220° C. over a period of 4 hours. Subsequently, the temperature was raised to 255° C., and the pressure in the reaction system was gradually reduced. A reaction was then performed at a reduced pressure of 30 Pa for 1 hour. Further, while nitrogen was introduced into the system to release the reduced pressure, the system was cooled to 200° C. 28.0 parts by mass of trimellitic anhydride was added to the system while stirring, and an addition reaction was performed for another 2 hours to obtain a polyester resin (C-2). The obtained polyester resin (C-2) was pale yellow and transparent. The reduced viscosity of the polyester resin (C-2) was measured to be 0.35 dl/g.

Further, 15 parts by mass of the polyester resin (C-2) and 15 parts by mass of tetrahydrofuran were placed in a reactor equipped with a stirrer, a thermometer, and a reflux condenser. The resulting mixture was heated at 70° C. and stirred to dissolve the resin. After the resin was completely dissolved, 31 parts by mass of triethylamine and 70 parts by mass of water were gradually added to a polyester solution while stirring. After the addition, the pressure in the reaction system was reduced to remove the tetrahydrofuran and the resulting mixture was cooled to room temperature. An appropriate amount of water was added to prepare a polyester resin (C-2) solution with a solids content of 30 mass %. The solids content of the polyester resin (C-2) had an acid value of 37.4 mgKOH/g.

Preparation of Acrylic Resin D-1

40 parts of propylene glycol monomethyl ether was placed in a flask equipped with a stirrer, a thermometer, and a reflux condenser. While heating the flask to maintain the temperature at 100° C., a mixture of 60.0 parts by mass of normal butyl acrylate, 42.0 parts by mass of methyl methacrylate, 2.9 parts by mass of 2-hydroxyethyl methacrylate, 5.7 parts by mass of acrylic acid, and 5 parts by mass of azobisisobutyronitrile was added dropwise over a period of 3 hours. After the dropwise addition, the resulting mixture was aged at the same temperature for 2 hours. The temperature of the reaction mixture was then reduced to 40° C., and 8.4 parts by mass of triethylamine and 165 parts by mass of water were added with stirring. After stirring was further continued for 1 hour, an appropriate amount of water was added to prepare an acrylic resin (D-1) solution with a solids content of 35 mass %. The solids content of the acrylic resin (D-1) had an acid value of 40.1 mgKOH/g.

Preparation of Substrate Polyester Resin E-1
Preparation of Antimony Trioxide Solution Antimony trioxide (produced by Sigma-Aldrich Japan) and ethylene glycol were placed into a flask and stirred at 150° C. for 4 hours to dissolve antimony trioxide. The resulting solution was then cooled to room temperature to prepare a 20 g/l solution of antimony trioxide in ethylene glycol.

Polymerization of Substrate Polyester Resin E-1

High-purity terephthalic acid and ethylene glycol were placed at a molar ratio of 1:2 into a 2-liter stainless steel autoclave equipped with a stirrer. Triethylamine was added in an amount of 0.3 mol % relative to the acid component. An esterification reaction was performed while water was distilled off from the reaction system at 250° C. under a pressure of 0.25 MPa to obtain a mixture of bis(2-hydroxyethyl)terephthalate and an oligomer having an esterification rate of about 95% (hereinbelow referred to as a BHET mixture). Subsequently, the solution of antimony trioxide in ethylene glycol was added as a polymerization catalyst to the BHET mixture in an amount of 0.04 mol % in terms of antimony atom relative to the acid component of the polyester. Subsequently, the resulting mixture was stirred in a nitrogen atmosphere at normal pressure at 250° C. for 10 minutes. Thereafter, while the temperature was raised to 280° C. over a period of 60 minutes, the pressure of the reaction system was gradually reduced to 13.3 Pa (0.1 Torr), and a polycondensation reaction was further performed at 280° C. and 13.3 Pa for 68 minutes to obtain a polyester resin (E-1) having an intrinsic viscosity (IV) (solvent: phenol/tetrachloroethane=60/40) of 0.61 dl/g and containing substantially no particles.

Preparation of Substrate Polyester Resin E-2
Preparation Example of Aluminum Compound Solution A 20 g/l aqueous solution of basic aluminum acetate (hydroxyaluminum diacetate; produced by Sigma-Aldrich Japan) and an equal volume (volume ratio) of ethylene glycol were placed into a flask, and stirred at room temperature for 6 hours. Water was then distilled off from the reaction system with stirring at 70 to 90° C. under reduced pressure (133 Pa) for several hours to prepare a 20 g/l solution of the aluminum compound in ethylene glycol.

Preparation Example of Phosphorus Compound Solution

Diethyl 3,5-di-tert-butyl-4-hydroxybenzylphosphonate (Irganox 1222, produced by BASF) as a phosphorus compound and ethylene glycol were placed in a flask and heated with stirring in a nitrogen atmosphere at a liquid temperature of 160° C. for 25 hours to prepare a 50 g/l solution of the phosphorus compound in ethylene glycol.

Preparation of Mixture of Aluminum Compound Solution and Phosphorus Compound Solution The solution of the aluminum compound in ethylene glycol obtained above in section "Preparation Example of Aluminum Compound Solution" and the solution of the phosphorus compound in ethylene glycol obtained above in section "Preparation Example of Phosphorus Compound Solution" were placed in a flask and mixed at room temperature to achieve an aluminum atom:phosphorus atom molar ratio of 1:2, and stirred for 1 day to prepare a catalyst solution.

Polymerization of Substrate Polyester Resin E-2

Polymerization was performed in the same manner as the polyester resin (E-1) except that the mixture of the aluminum compound solution and the phosphorus compound solution was used as a polycondensation catalyst in place of the antimony trioxide solution and that the mixture was added in an amount such that the aluminum content and the phosphorus content were 0.014 mol % and 0.028 mol %, relative to the acid component of the polyester, in terms of aluminum atom and phosphorus atom, respectively; and the polymerization time was changed to 68 minutes to obtain a polyester resin (E-2) having an intrinsic viscosity (IV) of 0.61 dl/g and containing substantially no particles.

Example 1

(1) Preparation of Coating Liquid

The following coating components were mixed in a mixed solvent of water and isopropanol (mass ratio: 80/20) to prepare a coating liquid having a polyurethane resin solution (A-1)/crosslinking agent (B-1) solution mass ratio of 70/30, based on solids content.

Mixed solvent (water/isopropanol) 78.26 parts by mass
Polyurethane resin (A-1) solution 14.00 parts by mass
Crosslinking agent (B-1) solution 5.25 parts by mass
Particles I (silica sol with an average particle size of 100 nm and a solids content of 40 mass %) 0.12 parts by mass
Particles II (silica sol with an average particle size of 40 to 50 nm and a solids content of 30 mass %) 1.87 parts by mass
Surfactant (a silicone-based surfactant with a solids content of 10 mass %) 0.50 parts by mass (2) Preparation of Laminated Polyester Film As a film material polymer, resin pellets of the polyester resin (E-1) were dried under a reduced pressure of 133 Pa at 135° C. for 6 hours. The dried pellets were then fed to an extruder and melt-extruded into a sheet at about 280° C. The resulting product was then quickly cooled, adhered, and solidified on rotating cooling metal rolls whose surface temperature was maintained at 20° C., thus obtaining an unstretched PET sheet.

The unstretched PET sheet was heated to 100° C. using a group of heated rolls and an infrared heater, and then stretched 3.5-fold in the longitudinal direction using a group of rolls that were different in peripheral speed, thus obtaining a uniaxially stretched PET film.

Subsequently, the coating liquid was applied to one surface of the PET film in an amount such that the final coating amount after drying (after biaxial stretching) was 0.13 g/m². After the coating liquid was dried, the film was stretched 4.0-fold in the width direction at 110° C. and heated at 230° C. for 5 seconds with the width direction of the film being fixed. Further, the film was subjected to a 3% relaxation treatment in the width direction, thus obtaining a laminated polyester film with a thickness of 100 μm. Table 1 shows the evaluation results.

Example 2

A laminated polyester film was obtained in the same manner as in Example 1, except that the polyurethane resin was changed to a polyurethane resin (A-2) and the ratio of the polyurethane resin to the crosslinking agent was changed to 60/40 (mass ratio).

Example 3

A laminated polyester film was obtained in the same manner as in Example 1, except that the polyurethane resin was changed to a polyurethane resin (A-3) and the ratio of the polyurethane resin to the crosslinking agent was changed to 50/50 (mass ratio).

Example 4

A laminated polyester film was obtained in the same manner as in Example 1, except that the crosslinking agent was changed to a crosslinking agent (B-2) and the ratio of the polyurethane resin to the crosslinking agent was changed to 60/40 (mass ratio).

Example 5

A laminated polyester film was obtained in the same manner as in Example 1, except that the crosslinking agent was changed to a crosslinking agent (B-3) and the ratio of the polyurethane resin to the crosslinking agent was changed to 60/40 (mass ratio).

Example 6

A laminated polyester film was obtained in the same manner as in Example 1, except that a crosslinking agent (B-4) was used in addition to the polyurethane resin (A-1) and the crosslinking agent (B-1), and the ratio of the components was changed to (A-1)/(B-1)/(B-4)=55/35/10 (mass ratio).

Example 7

A laminated polyester film was obtained in the same manner as in Example 1, except that a polyester resin (C-1) was used in addition to the polyurethane resin (A-1) and the crosslinking agent (B-1), and the ratio of the components was changed to (A-1)/(B-1)/(C-1)=36/24/40 (mass ratio).

Example 8

A laminated polyester film was obtained in the same manner as in Example 1, except that a polyester resin (C-1) was used in addition to the polyurethane resin (A-1) and the crosslinking agent (B-1), and the ratio of the components was changed to (A-1)/(B-1)/(C-1)=24/16/60 (mass ratio).

Example 9

A laminated polyester film was obtained in the same manner as in Example 1, except that resin pellets of the polyester resin (E-2) were used as a film material polymer.

Example 10

A laminated polyester film was obtained in the same manner as in Example 1, except that the polyurethane resin was changed to a polyurethane resin (A-8).

Comparative Example 1

A laminated polyester film was obtained in the same manner as in Example 1, except that only the polyurethane resin (A-1) was used and the crosslinking agent (B-1) was not used.

Comparative Example 2

A laminated polyester film was obtained in the same manner as in Example 1, except that only the crosslinking agent (B-1) was used and the polyurethane resin (A-1) was not used.

Comparative Example 3

A laminated polyester film was obtained in the same manner as in Example 1, except that the polyurethane resin was changed to a polyurethane resin (A-4).

Comparative Example 4

A laminated polyester film was obtained in the same manner as in Example 1, except that the polyurethane resin was changed to a polyurethane resin (A-5) and the ratio of the polyurethane resin to the crosslinking agent was changed to 60/40 (mass ratio).

Comparative Example 5

A laminated polyester film was obtained in the same manner as in Example 1, except that the polyurethane resin was changed to a polyurethane resin (A-6) and the ratio of the polyurethane resin to the crosslinking agent was changed to 50/50 (mass ratio).

Comparative Example 6

A laminated polyester film was obtained in the same manner as in Example 1, except that the polyurethane resin was changed to a polyurethane resin (A-7) and the crosslinking agent was changed to a crosslinking agent (B-5).

Comparative Example 7

A laminated polyester film was obtained in the same manner as in Example 1, except that the crosslinking agent was changed to a crosslinking agent (B-5) and the ratio of the polyurethane resin to the crosslinking agent was changed to 75/25 (mass ratio).

Comparative Example 8

A laminated polyester film was obtained in the same manner as in Example 1, except that the crosslinking agent was changed to a crosslinking agent (B-6).

Comparative Example 9

A laminated polyester film was obtained in the same manner as in Example 1, except that a polyurethane resin (C-2) was used in place of the polyurethane resin (A-1).

Comparative Example 10

A laminated polyester film was obtained in the same manner as in Example 1, except that an acrylic resin (D-1) was used in place of the polyurethane resin (A-1).

Table 1 summarizes evaluation results of the Examples and Comparative Examples.

As shown in Table 1, the laminated polyester films obtained in the Examples were satisfactory in terms of haze, blocking resistance, adhesion to UV-curable ink, adhesion to a hardcoat layer, and wet-heat resistance. In contrast, the laminated polyester films obtained in Comparative Examples 1 to 10 were unsatisfactory in terms of at least one of the evaluation items.

TABLE 1

| | Substrate Resin | Polyurethane resin Kind | Polyurethane resin Acid value (mgKOH/g) | Crosslinking agent Kind | Crosslinking agent Acid value (mgKOH/g) | Resin other than polyurethane resin or crosslinking agent other than the crosslinking agent described in the left column Kind | Resin other than polyurethane resin or crosslinking agent other than the crosslinking agent described in the left column Acid value (mgKOH/g) | Content in the coating liquid for forming the coating layer (mass %) (*1) Polyurethane resin | Content in the coating liquid for forming the coating layer (mass %) (*1) Crosslinking agent |
|---|---|---|---|---|---|---|---|---|---|
| Ex. 1 | E-1 | A-1 | 37.5 | B-1 | 37.6 | — | — | 70 | 30 |
| Ex. 2 | E-1 | A-2 | 36.3 | B-1 | 37.6 | — | — | 60 | 40 |
| Ex. 3 | E-1 | A-3 | 36.0 | B-1 | 37.6 | — | — | 50 | 50 |
| Ex. 4 | E-1 | A-1 | 37.5 | B-2 | 41.2 | — | — | 60 | 40 |
| Ex. 5 | E-1 | A-1 | 37.5 | B-3 | 39.8 | — | — | 60 | 40 |
| Ex. 6 | E-1 | A-1 | 37.5 | B-1 | 37.6 | B-4 | 0.0 | 55 | 35 |
| Ex. 7 | E-1 | A-1 | 37.5 | B-1 | 37.6 | C-1 | 0.9 | 36 | 24 |
| Ex. 8 | E-1 | A-1 | 37.5 | B-1 | 37.6 | C-1 | 0.9 | 24 | 16 |
| Ex. 9 | E-2 | A-1 | 37.5 | B-1 | 37.6 | — | — | 70 | 30 |
| Ex. 10 | E-1 | A-8 | 32.0 | B-1 | 37.6 | — | — | 70 | 30 |
| Comp. 1 | E-1 | A-1 | 37.5 | — | — | — | — | 100 | — |
| Comp. 2 | E-1 | — | — | B-1 | 37.6 | — | — | — | 100 |
| Comp. 3 | E-1 | A-4 | 25.3 | B-1 | 37.6 | — | — | 70 | 30 |
| Comp. 4 | E-1 | A-5 | 55.0 | B-1 | 37.6 | — | — | 60 | 40 |
| Comp. 5 | E-1 | A-6 | 0.2 | B-1 | 37.6 | — | — | 50 | 50 |
| Comp. 6 | E-1 | A-7 | 23.2 | B-5 | 22.8 | — | — | 70 | 30 |
| Comp. 7 | E-1 | A-1 | 37.5 | B-5 | 22.8 | — | — | 75 | 25 |
| Comp. 8 | E-1 | A-1 | 37.5 | B-6 | 55.4 | — | — | 70 | 30 |
| Comp. 9 | E-1 | — | — | B-1 | 37.6 | C-2 | 37.4 | — | 30 |
| Comp. 10 | E-1 | — | — | B-1 | 37.6 | D-1 | 40.1 | — | 30 |

| | Content in the coating liquid for forming the coating layer (mass %) (*1) Resin other than polyurethane resin or crosslinking agent other than the crosslinking agent described in the left column | Haze (%) | Blocking resistance | UV ink adhesion Indigo Dose 100 (mJ/cm²) | UV ink adhesion Indigo Dose 40 (mJ/cm²) | UV ink adhesion White Dose 100 (mJ/cm²) | UV ink adhesion White Dose 40 (mJ/cm²) | Hardcoat adhesion | Wet-heat resistance UV ink | Wet-heat resistance Hardcoat |
|---|---|---|---|---|---|---|---|---|---|---|
| Ex. 1 | — | 0.8 | A | A | A | A | A | A | B | B |
| Ex. 2 | — | 0.7 | A | A | A | A | A | A | A | A |
| Ex. 3 | — | 0.7 | A | A | A | A | A | A | A | A |
| Ex. 4 | — | 0.9 | A | A | A | A | A | A | B | B |
| Ex. 5 | — | 0.7 | A | A | A | A | B | B | B | B |
| Ex. 6 | 10 | 0.7 | A | A | A | A | B | A | B | B |
| Ex. 7 | 40 | 0.8 | A | A | A | A | B | A | B | B |
| Ex. 8 | 60 | 0.6 | A | A | A | A | B | A | B | B |
| Ex. 9 | — | 0.6 | A | A | A | A | A | A | B | B |
| Ex. 10 | — | 0.9 | A | A | A | A | A | A | A | A |
| Comp. 1 | — | 0.8 | A | B | C | C | D | C | D | C |
| Comp. 2 | — | 0.7 | A | B | C | C | D | D | D | D |
| Comp. 3 | — | 0.7 | A | B | B | C | D | B | D | B |
| Comp. 4 | — | 2.2 | A | A | A | A | A | A | C | D |
| Comp. 5 | — | 0.8 | C | B | C | D | D | C | D | D |
| Comp. 6 | — | 0.9 | A | B | B | C | D | B | D | B |
| Comp. 7 | — | 1.0 | A | B | B | C | D | B | D | B |
| Comp. 8 | — | 2.5 | A | A | A | A | A | A | C | C |
| Comp. 9 | 70 | 0.6 | B | B | D | D | D | C | D | D |
| Comp. 10 | 70 | 0.6 | A | B | D | D | D | C | D | D |

*1: "Content in the coating liquid for forming the coating layer (mass %)" is the percentage of each component when the solids content of all resins and all crosslinking agents in the coating liquid for forming the coating layer is defined as 100 mass %.

INDUSTRIAL APPLICABILITY

According to the present invention, a laminated polyester film that is suitable for use in all fields, such as optical, packaging, and labeling applications, can be provided.

The invention claimed is:

1. A laminated polyester film comprising
a polyester film and
a coating layer on at least one surface of the polyester film,
the coating layer comprising a composition containing a polyurethane resin having a carboxyl group and having an acid value of 30 to 50 mgKOH/g and a crosslinking agent having a carboxyl group and having an acid value of 30 to 50 mgKOH/g.

2. The laminated polyester film according to claim 1, wherein the crosslinking agent is an isocyanate compound.

3. The laminated polyester film according to claim 1, wherein the crosslinking agent is a blocked isocyanate having three or more functional groups.

4. The laminated polyester film according to claim 1, wherein the composition further comprises a polyester resin that contains as constituents (a) a dicarboxylic acid and (b) a diol having a branched structure or a diol having one or more ether bonds.

5. The laminated polyester film according to claim 1, wherein the laminated polyester film has a haze of 2.5% or less.

* * * * *